US009824324B2

(12) United States Patent
Trew et al.

(10) Patent No.: US 9,824,324 B2
(45) Date of Patent: Nov. 21, 2017

(54) AUTOMATED PACKAGE RELOCATION FROM AN UNMANNED KIOSK

(71) Applicant: Google Inc., Mountain View, CA (US)

(72) Inventors: Brandon Kyle Trew, San Francisco, CA (US); Ameena Hassam, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 584 days.

(21) Appl. No.: 14/276,841

(22) Filed: May 13, 2014

(65) Prior Publication Data

US 2015/0332206 A1 Nov. 19, 2015

(51) Int. Cl.
G06Q 10/08 (2012.01)

(52) U.S. Cl.
CPC ....... *G06Q 10/083* (2013.01); *G06Q 10/0836* (2013.01)

(58) Field of Classification Search
CPC . G06Q 10/0836; G06Q 10/083; G06Q 10/087
USPC ....................................................... 705/330
See application file for complete search history.

(56) References Cited

U.S. PATENT DOCUMENTS

| 6,266,142 B1 | 7/2001 | Junkins et al. |
| 7,327,258 B2 | 2/2008 | Fast et al. |
| 9,056,676 B1 | 6/2015 | Wang |
| 9,244,147 B1 | 1/2016 | Soundararajan et al. |
| 9,336,506 B2 | 5/2016 | Shucker et al. |
| 9,489,490 B1* | 11/2016 | Theobald ............ G06F 19/3462 |
| 9,652,731 B2 | 5/2017 | Shucker et al. |
| 2002/0065600 A1 | 5/2002 | Oka et al. |

(Continued)

FOREIGN PATENT DOCUMENTS

| CN | 101604830 A | 12/2009 |
| CN | 101979961 A | 2/2011 |

(Continued)

OTHER PUBLICATIONS

Perry, T. (Dec. 19, 2013). "Matternet's Package Delivery Drones." IEEE Spectrum http://spectrum.ieee.org/podcast/aerospace/aviation/matternets-package-delivery-drones.*

(Continued)

*Primary Examiner* — Michael Harrington
*Assistant Examiner* — Bryan Kirk
(74) *Attorney, Agent, or Firm* — Johnson, Marcou & Isaacs, LLC

(57) ABSTRACT

Automated package deliveries comprises a server at a package delivery system that receives a request for a package delivery, the request comprising an identification of a package and an identification of a first kiosk location. The server associates the package with an aerial delivery device and a user authentication to retrieve the package. The server transmits to the delivery device instructions to deliver the package to the first kiosk. Subsequently, the server receives a request from a user computing device to retrieve the package from the first kiosk and deliver the package to an alternate kiosk. The server transmits to the delivery device instructions to retrieve the package from the first kiosk and instructions to deliver the package to the alternate kiosk. The delivery device retrieves the package from the automated kiosk and delivers the package to the alternate kiosk.

19 Claims, 8 Drawing Sheets

(56) References Cited

U.S. PATENT DOCUMENTS

| | | | |
|---|---|---|---|
| 2002/0156645 | A1 | 10/2002 | Hansen et al. |
| 2003/0196358 | A1 | 10/2003 | Fratzke et al. |
| 2004/0054607 | A1 | 3/2004 | Waddington et al. |
| 2008/0262718 | A1 | 10/2008 | Farwell et al. |
| 2013/0240673 | A1 | 9/2013 | Schlosser et al. |
| 2013/0332008 | A1* | 12/2013 | Herman ............... B64C 39/024 701/2 |
| 2014/0022055 | A1 | 1/2014 | Levien et al. |
| 2014/0032034 | A1* | 1/2014 | Raptopoulos ........ G08G 5/0069 701/25 |
| 2014/0149244 | A1 | 5/2014 | Abhyanker et al. |
| 2014/0180914 | A1* | 6/2014 | Abhyanker ............. G01C 1/00 705/39 |
| 2014/0204360 | A1 | 7/2014 | Dowski et al. |
| 2014/0254896 | A1 | 9/2014 | Zhou et al. |
| 2014/0278099 | A1* | 9/2014 | Schenken ............. G06Q 10/02 701/533 |
| 2015/0120094 | A1 | 4/2015 | Kimchi et al. |
| 2015/0203213 | A1 | 7/2015 | Levien et al. |
| 2015/0205301 | A1 | 7/2015 | Gilmore et al. |
| 2015/0317596 | A1* | 11/2015 | Hejazi .................... G06Q 50/28 705/330 |
| 2016/0117934 | A1 | 4/2016 | Soundararajan et al. |
| 2016/0224932 | A1 | 8/2016 | Shucker et al. |
| 2017/0098378 | A1 | 4/2017 | Soundararajan et al. |
| 2017/0220981 | A1 | 8/2017 | Shucker et al. |

FOREIGN PATENT DOCUMENTS

| | | | | |
|---|---|---|---|---|
| CN | 103424126 A | 12/2013 | | |
| JP | 2003-300626 A | 10/2003 | | |
| JP | 2007-257474 A | 10/2007 | | |
| JP | 2014-031118 A | 2/2014 | | |
| KR | 10-2013-0127585 A | 11/2013 | | |
| MY | WO 2010077129 A2 * | 7/2010 | ............ | G06Q 10/02 |
| WO | 2015/168573 A1 | 11/2015 | | |
| WO | 2015/175242 A1 | 11/2015 | | |

OTHER PUBLICATIONS

Berthon, "International Search Report and Written Opinion issued in copending PCT Application No. PCT/US2015/028817 filed May 1, 2015", dated Jul. 14, 2015, 1-10.
Berthon, "International Search Report and Written Opinion issued in copending PCT Application No. PCT/US2015/028823 filed May 1, 2015", dated Jul. 14, 2015, 1-10.
Dunn, "Office Action issued in copending U.S. Appl. No. 14/520,987, filed Oct. 22, 2014", dated May 28, 2015, 1-8.
Haque, et al., "Autonomous Quadcopter for product home delivery", Electrical Engineering and Information & Communication Technology (ICEEICT), 2014 International Conference on, vol., No., doi: 10.1109/ICEEICT.2014.6919154, Apr. 12, 2014, 1,5, 10-12.
Marshall, "Office Action issued in copending U.S. Appl. No. 14/268,683, filed May 2, 2014", dated Apr. 20, 2015, 1-14.
U.S. Appl. No. 14/967,254 to Soundararajan et al. filed Dec. 11, 2015.
Marshall, "Office Action issued in copending U.S. Appl. No. 14/268,683, filed May 2, 2014", dated Sep. 28, 2015, 1-6.
Marshall, "U.S. Office Action issued in copending U.S. Appl. No. 15/097,125, filed Apr. 12, 2016", dated May 19, 2016, 12 pages.
Marshall, "U.S. Office Action issued in copending U.S. Appl. No. 15/097,125, filed Apr. 12, 2016", dated Sep. 6, 2016, 6 pages.
Rees, "Australian Office Action issued in Australian Application No. 2015252879", dated Nov. 11, 2016, 2 pages.
Wittmann-Regis, "International Preliminary Report on Patentability issued in International Application No. PCT/US2015/028817", dated Nov. 17, 2016, 8 pages.
Wittmann-Regis, "International Preliminary Report on Patentability issued in International Application No. PCT/US2015/028823", dated Nov. 24, 2016, 8 pages.
U.S. Appl. No. 14/275,545 to Trew et al. filed May 12, 2014.
U.S. Appl. No. 14/521,033 to Soundararajan et al. filed Oct. 22, 2014.
Kim, "Korean Office Action issued in Korean Application No. 10-2016-7032993", dated Jun. 30, 2017, 3 pages of English Translation and 3 pages of Korean Office Action.
Singh, "U.S. Office Action issued in copending U.S. Appl. No. 14/275,545, filed May 12, 2014", dated Jun. 15, 2017, 27 pages.
Marshall, "U.S. Office Action issued in copending U.S. Appl. No. 15/486,061, filed Apr. 12, 2017", dated May 17, 2017, 6 pages.
Watanabe, "Japanese Office Action issued in Japanese Application No. 2016-575971", dated May 8, 2017, 7 pages of English Translation and 7 pages of Japanese Office Action.
Kim, "Korean Office Action issued in Korean Application No. 10-2016-7032993", dated Mar. 9, 2017, 7 pages of English Translation and 6 pages of Korean Office Action.
Won, "Drone (UAV, UAV) Drones", Airstrike: Commercial Drones Bloomed Beyond Defense, retrieved from Internet Article: <http://cfile203.uf.daum.net/attach/2647D738535155A11A68B3>, Apr. 17, 2014 19 pages.
U.S. Appl. No. 15/486,061 to Shucker et al. filed Apr. 12, 2017.
Ranga, "Australian Office Action issued in Australian Application No. 2015259599", dated Jun. 6, 2017, 4 pages.
Kim, "Korean Office Action issued in Korean Application No. 10-2016-7032993", dated Aug. 11, 2017, 4 pages of English Translation and 4 pages of Korean Office Action.
Lee, "Korean Office Action issued in Korean Application No. 10-2016-7034513", dated Aug. 11, 2017, 5 pages of English Translation and 4 pages of Korean Office Action.
Ott, "Canada Office Action received for Canada Patent Application No. 2,949,054", dated Aug. 3, 2017, 3 pages.
Ott, "Canada Office Action received for Canada Patent Application No. 2,947,719", dated Aug. 3, 2017, 4 pages.
U.S. Appl. No. 15/705,256 to Soundararajan et al. filed on Sep. 14, 2017.
"Chinese Office Action issued in Chinese Application No. 201580029458.2", dated Aug. 21, 2017, 7 pages of English Translation and 6 pages of Chinese Office Action.
Watanabe, "Japanese Office Action issued in Japanese Application No. 2016-575971", dated Sep. 15, 2017, 4 pages of English Translation and 4 pages of Japanese Office Action.

* cited by examiner

AUTOMATED PACKAGE RELOCATION FROM AN UNMANNED KIOSK

TECHNICAL FIELD

The present disclosure relates generally to automated package delivery, and more particularly to relocating packages with an aerial drone from a mechanized kiosk.

BACKGROUND

Delivery services (also known as courier services, mail services, and shipping services), such as those offered by the U.S. Postal Service and commercial carriers provide delivery of letters, packages, and parcels (hereinafter referred to as "packages") to and from residences and businesses across the country. Other delivery services may be provided by merchants, retailers, manufacturers, or other organizations that desire to ship products to users. Typically, such services operate in hub and spoke architecture.

A typical nationwide or international delivery service maintains a large fleet of vehicles. Such vehicles include airplanes and semi-trailer trucks to move packages between hubs and spokes, and smaller vehicles for the "last mile" from spoke endpoints to delivery destinations (for example a home or business). The two largest commercial delivery services in the U.S. together operate over 100,000 last mile vehicles—each of which requires a human operator. In some situations, interaction with a person at pickup or delivery is desired, for example, for proof of delivery, payment on delivery (also known as "cash on delivery" or "COD"), or payment of delivery costs on pickup. The growth of commercial areas, such as business-to-consumer e-commerce and online shopping, is expected to continue to increase the demand for delivery services, and hence the need for capacity and efficiency in the last mile.

Recently, package delivery systems have employed kiosks for receiving packages. The package delivery systems deliver packages to the kiosk, and a user retrieves the package directly from the kiosk. The kiosk delivery provides a safer delivery method when the user may be unavailable to receive a valuable package at the residence of the user. Additionally, unmanned aerial delivery devices are being developed for delivery of packages to users.

Conventional delivery systems do not allow packages to be relocated by unmanned aerial delivery devices from an unmanned kiosk to an alternate kiosk. Conventional delivery systems do not allow packages to be returned by unmanned aerial delivery devices from an unmanned kiosk back to the package delivery service.

SUMMARY

In certain example aspects described herein, a computer-implemented method for automated package delivery is provided. In an example embodiment, a server at a package delivery system receives a request for a package delivery, the request comprising an identification of a package and an identification of a first destination kiosk location. The server associates the package with an aerial delivery device and a user authentication to retrieve the package from the pickup location. The server transmits to the delivery device instructions to deliver the package to the first destination kiosk. Subsequently, the server receives a request from a user computing device to retrieve the package from the first kiosk and deliver the package to an alternate kiosk that is more convenient to the user at that time. The server transmits to the delivery device instructions to retrieve the package from the first kiosk and instructions to deliver the package to the alternate kiosk. The delivery device retrieves the package from the automated kiosk and delivers the package to the alternate kiosk or back to the package delivery system.

In certain other example aspects described herein, a system and a computer program product for automated package delivery are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
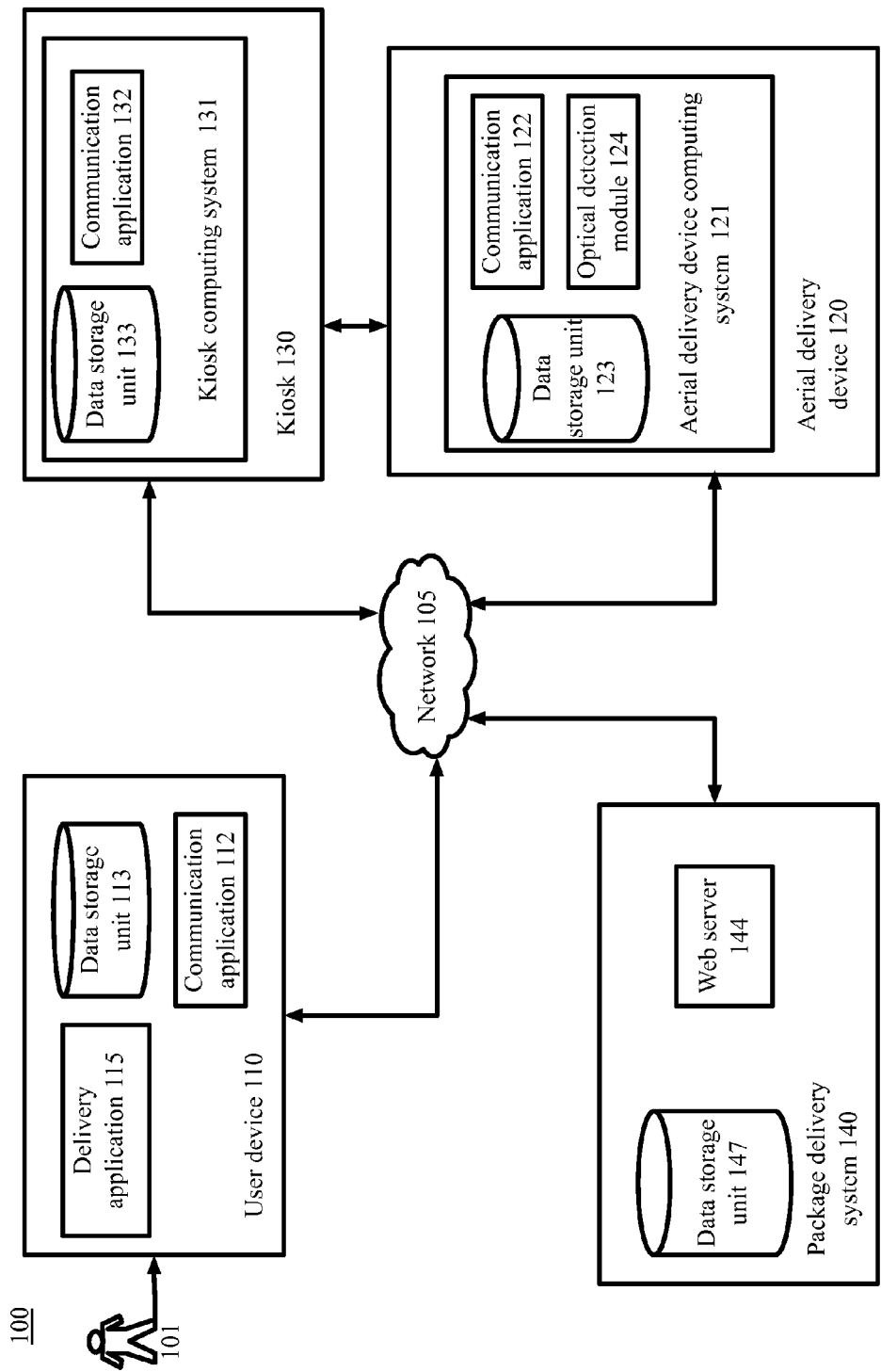
FIG. 1 is a block diagram depicting a system for an aerial delivery device to relocate a package to a kiosk, in accordance with certain example embodiments.

The example embodiments described herein provide computer-implemented techniques for relocating a package delivery to an alternate kiosk via a drone. In an example embodiment, an aerial delivery device, such as a drone, is transmitted instructions for delivery of a package to a kiosk. After delivery of the package to the first kiosk, the user requests an alternate kiosk for delivery of package. An aerial delivery device retrieves the package from the first kiosk and delivers the package to the alternate kiosk. The user subsequently provides authentication at the alternate kiosk and retrieves the package. In an alternate embodiment, the user provides a request to return a product to the package delivery system warehouse or other location. The user transports the package to kiosk and enters an authentication on a user interface of the kiosk. The kiosk makes a package bin available to the user. When the user deposits the package, the kiosk transmits a request for an aerial delivery device to retrieve the package and return the package to the package delivery system or other location.

In an example, a package delivery system identifies a package for delivery to a user. The package delivery system may be a warehouse depot for a merchant system or manufacturer. The package delivery system may be a courier service, a package delivery agent, or any suitable system. The package is associated with an aerial delivery device for delivery.

The user provides a preferred kiosk location for delivery of the package. The user is associated with a user identification number, a password, or other authentication data.

The package delivery system provides the kiosk location to the aerial delivery device. For example, the package delivery system provides an address for the kiosk. In another example, the package delivery system provides a GPS location to the kiosk. Any suitable instructions that will allow the aerial delivery device to locate the kiosk may be used.

Upon arrival at the kiosk location, the aerial delivery device initiates communication with the kiosk. The communication may be transmitted via any suitable technology, such as near field communication. After confirming that the aerial delivery device is at the correct kiosk location, the kiosk opens a bay door or other access portal. The aerial delivery device deposits the package into the bay door, confirms the delivery, and departs. When the kiosk receives a package, the kiosk identifies the package and the associated user. The kiosk transports the package to the appropriate package bin.

Before the user retrieves the package, the user requests an alternate delivery kiosk. The user may select the alternate kiosk by accessing the package delivery system on the Internet or via application on a user computing device. The package delivery system provides instructions to an aerial delivery device to retrieve the package from the kiosk. The first kiosk prepares the package for retrieval by the aerial delivery device by moving the package to the bay. Upon arrival of the aerial delivery device the kiosk opens the bay and allows the aerial delivery device to retrieve the package.

The aerial delivery device delivers package to the alternate kiosk. The package is received by alternate kiosk in a similar manner as the first kiosk received the package. When the user arrives, the user enters an authentication into the user interface of the kiosk. The user is allowed access to the appropriate package bin by the kiosk. The kiosk may provide a confirmation that the user retrieved the package to the package delivery system.

In an alternate embodiment, the user provides a request to return a product to the package delivery system warehouse or other location. The user may receive an authorization from a merchant system, a manufacturer, a retailer, or other party to return a package. For example, the user may contact an online retailer and request an authorization to return a package. In any suitable manner, the user may indicate to the package delivery system that the package is being returned. The user transports the package to kiosk and enters an authentication on a user interface of the kiosk. The kiosk makes a package bin available to the user. When the user deposits the package, the kiosk transmits a request for an aerial delivery device to retrieve the package. In a certain embodiment, the user has not retrieved the package from the kiosk at the time of the authorization to return the package. In this example, the package is returned to the package delivery system directly form the first kiosk.

Upon arrival by the aerial delivery device, the kiosk transports the package to a bay for pickup by the aerial delivery device. The aerial delivery device retrieves the package and transports the package to the package delivery system warehouse or other location.

Example System Architecture

Turning now to the drawings, in which like numerals indicate like (but not necessarily identical) elements throughout the figures, example embodiments are described in detail.

FIG. 1 is a block diagram depicting a system 100 system for an aerial delivery device 120 to deliver a package to a kiosk 130, in accordance with certain example embodiments. As depicted in FIG. 1, the system 100 includes network computing devices 110, 120, 130, and 140 that are configured to communicate with one another via one or more networks 105. In some embodiments, a user associated with a device must install an application and/or make a feature selection to obtain the benefits of the techniques described herein.

The network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 105. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 may be operated or configured by users 101, aerial delivery device operators, kiosk operators, and package delivery system operators, respectively.

An example user computing device 110 comprises a data storage unit 113, a delivery application 115, and a communication application 112. In an example embodiment, a user interface enables the user 101 to interact with the delivery application 115 and/or the communication application 112. For example, the user interface may be a touch screen, a voice-based interface or any other interface that allows the user 101 to provide input and receive output from an application or module on the user computing device 110.

In an example embodiment, the data storage unit 113 comprises a local or remote data storage structure accessible to the user computing device 110 suitable for storing information. In an example embodiment, the data storage unit 113 stores encrypted information, such as HTML5 local storage.

In an example embodiment, the user 101 can use a communication application 112, such as a web browser application or a delivery application 115, to view, download, upload, or otherwise access documents or web pages via a distributed network 105.

In an example embodiment, the delivery application 115 is a program, function, routine, applet, or similar entity that exists on and performs operations on the user computing device 110. In certain embodiments, the user 101 must install the delivery application 115 and/or make a feature selection on the user computing device 110 to obtain the benefits of the techniques described herein. In an example embodiment, the user 101 may access the delivery application 115 on the user computing device 110 via a user interface. In an example embodiment, a user 101 signs in to the delivery application 115, which enables the user 101 to interact with the package delivery system 140, a kiosk 130 a merchant system, or other system to arrange, alter, or cancel the delivery of a product.

An example package delivery system 140 comprises a web server 144 and a data storage unit 147. In an example embodiment, the package delivery system 140 communicates with the user device 110, merchant systems, other package delivery systems, or any other person, group, or system that delivers or receives packages. In an example embodiment, user device 110 has a delivery application 115 distributed by the package delivery system 140 that enables the user 101 to access an account or information about a package. In another example embodiment, the user 101 accesses an account via the communication application 112 of the user device 110. In an example embodiment, when the user 101 accesses his account via the delivery application 115 or communication application 112, the web server 144 logs user device 110 location data.

The package delivery system 140 may represent any system that delivers or receives packages. For example, the package delivery system 140 may be a courier, a merchant system, a retailer, a shipping company, a postal service, or any suitable system.

The aerial delivery device 120 may be a drone or other unmanned vehicle. The aerial delivery device 120 may be helicopter, quadcopter, or other aerial delivery device. In alternative embodiments, a device other than an aerial delivery device can be utilized, which does not deliver packages via flight. For example, a wheeled vehicle or other vehicle that delivers packages without flight may be used.

In an example, the non-flying delivery device may utilize wheels, articulated legs, or any suitable means for propulsion. The non-flying delivery device may drive to a location, scan for the QR code 103, and proceed to the QR code 103 by rolling, walking, or via any suitable propulsion. The non-flying delivery device may deposit the package via an articulated arm, a conveyor belt, or any other suitable means.

The aerial delivery device 120 employs an aerial delivery device computing system 121. The aerial delivery device computing system 121 comprises the hardware, software, and other devices for communications, navigations, image capturing, image processing, and any other suitable computerized or automated functions.

The aerial delivery device computing system 121 comprises a communication application 122, an optical detection module 124, and a data storage unit 123. The aerial delivery device computing system 121 may utilize a communication application 122 to receive instructions for package deliveries. For example, the aerial delivery device computing system 121 may receive, via the communication application 122, delivery addresses, GPS locations, package details, or other delivery information. The aerial delivery device computing system 121 may utilize the data storage unit 123 for storing the information received via the communication application, and other suitable data.

The optical detection module 124 may be a video camera or a still camera that captures images. The optical detection module 124 may be a barcode scanner, a QR code scanner, or any suitable optical detection module 124.

The aerial delivery device computing system 121 may also comprise a navigation system, such as a global positioning system ("GPS") or other navigation system. For example, the aerial delivery device computing system 121 may have a mapping system stored in the data storage unit 123 that works alone or in conjunction with onboard GPS technology to assist the aerial delivery device computing system 121 with navigation.

The kiosk computing system 131 may utilize a communication application 132 to receive instructions for package deliveries. For example, the kiosk 130 may receive via the communication application 132, delivery addresses, user 101 identification, user 101 authentication information, package details, or other delivery information. The kiosk 130 may use the communication application 132 to communicate with the aerial delivery device 120 for package deliveries. The kiosk 130 may utilize the data storage unit 133 for storing the information received via the communication application 132, and other suitable data.

The kiosk 130 may be a storage kiosk comprising compartments that are locked and controlled by a kiosk computing system 131. Alternatively, the compartments may be accessible by a key, combination, or other suitable access system. The kiosk 130 may have a user interface that allows a user 101 to enter access codes, personal identification codes, delivery information, or any suitable information. The kiosk 130 may store a package for a user 101 until the user 101 is available to retrieve the package. The kiosk 130 may utilize automated machinery for transporting a package to a particular compartment. The kiosk may utilize automated doors for the bay door or other suitable doors that open automatically to receive the package, provide access to the user 101, or for other suitable purposes. The kiosk 130 may employ barcode scanners, QR code scanners, optical character recognition technology, or other suitable technology for determining the identity of a package. The kiosk 130 may a scanner or other optical reading device for capturing information from a label on the package, a sticker on the package, printed data, or any suitable available information.

In an example embodiment, the kiosk 130 may open a by door to receive a package after exchanging appropriate communications with the aerial delivery device 120. The aerial delivery device 120 hovers over the open bay door and deposits the package in to open bay door. The aerial delivery device 120 may deposit the package by detaching a hook or other retention device and allowing the package to drop away from the aerial delivery device 120. The package drops into a compartment in the kiosk 131. The bin is locked and is available to be accessed by the user 101 for retrieval of the package.

The kiosk 130 employs a kiosk computing system 131. The kiosk computing system 131 comprises the hardware, software, and other devices for communications, package handling, door controls, user interfaces, image capturing, image processing, and any other suitable computerized or automated functions.

The kiosk computing system 131 may utilize a communication application 132 to receive instructions for package deliveries. For example, the kiosk 130 may receive via the communication application 132, delivery addresses, user 101 identification, user 101 authentication information, package details, or other delivery information. The kiosk 130 may use the communication application 132 to communicate with the aerial delivery device 120 for package deliveries. The kiosk 130 may utilize the data storage unit 133 for storing the information received via the communication application 132, and other suitable data.

It will be appreciated that the network connections shown are example and other means of establishing a communications link between the computers and devices can be used. Moreover, those having ordinary skill in the art having the benefit of the present disclosure will appreciate that the user computing device 110, the aerial delivery device 120, the kiosk 130, and the package delivery system 140 illustrated in FIG. 1 can have any of several other suitable computer system configurations. For example, a user computing device 110 embodied as a mobile phone or handheld computer may or may not include all the components described above.

Example Processes

The example methods illustrated in FIGS. 2-7 are described hereinafter with respect to the components of the example operating environment 100. The example methods of FIGS. 2-7 may also be performed with other systems and in other environments.

Figure 2:
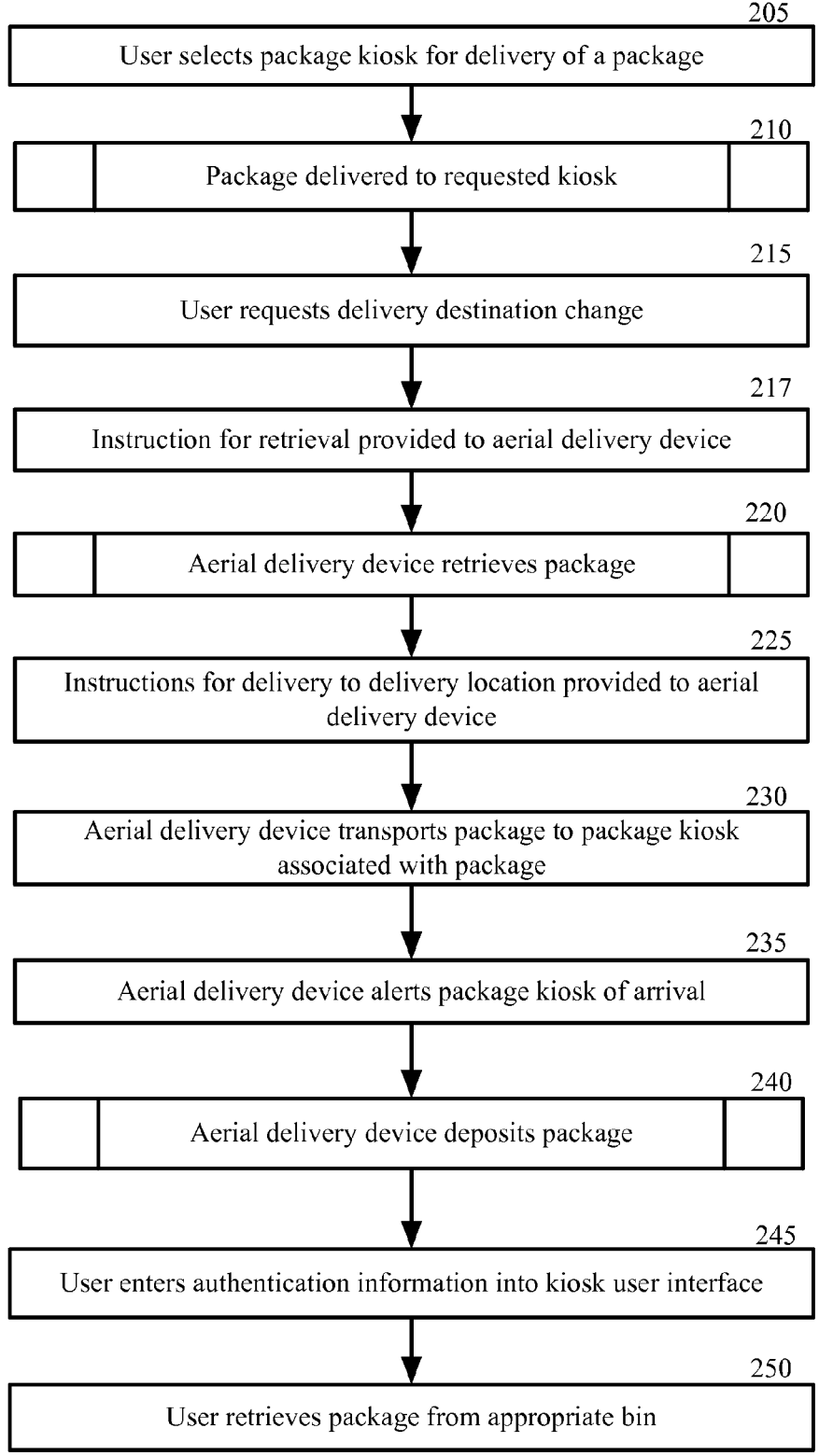
FIG. 2 is a block flow diagram depicting a method for an aerial delivery device to relocate a package to a kiosk, in accordance with certain example embodiments.

FIG. 2 is a block diagram depicting a method 200 for an aerial delivery device 120 to relocate a package from a kiosk 130, in accordance with certain example embodiments. The method 200 is described with reference to the components illustrated in FIG. 1.

In block 205, a user 101 selects a package kiosk 130 for delivery of a package. The package may be any product for delivery to user 101, a merchant system, or other recipient. The package may be a product shipped from a merchant system, shipped from another user 101, shipped from a manufacturer, or may be shipped from any suitable shipper. The user 101 may select a delivery kiosk 130 via the delivery application 115 on the user computing device 110. In an alternate embodiment, the user 101 may select the kiosk 130 on a website of the package delivery service 140. In an alternate embodiment, the user 101 may select the kiosk 130 from a merchant system, such as at the time of entering delivery information while ordering a product. Any suitable application or method may be used by the user 101 to select a delivery kiosk 130.

In block 210, a package is delivered to a selected kiosk. The details of block 210 are described in greater detail in the method 210 with respect to FIG. 3.

Figure 3:
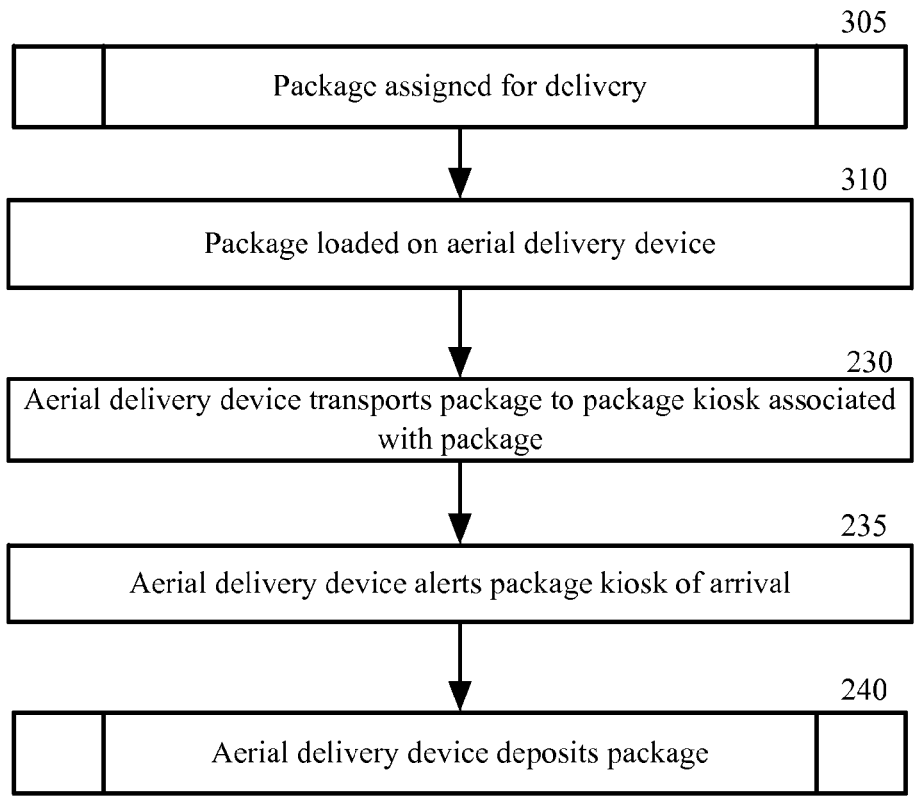
FIG. 3 is a block flow diagram depicting a method for an aerial delivery device to deliver a package to a kiosk, in accordance with certain example embodiments.

FIG. 3 is a block diagram depicting a method 210 for a package to be delivered to a selected kiosk, in accordance with certain example embodiments, as referenced in block 210 of FIG. 2. The method 210 is described with reference to the components illustrated in FIG. 1.

In block 305, a package is assigned for delivery. The details of block 305 are described in greater detail in the method 305 with respect to FIG. 4.

Figure 4:
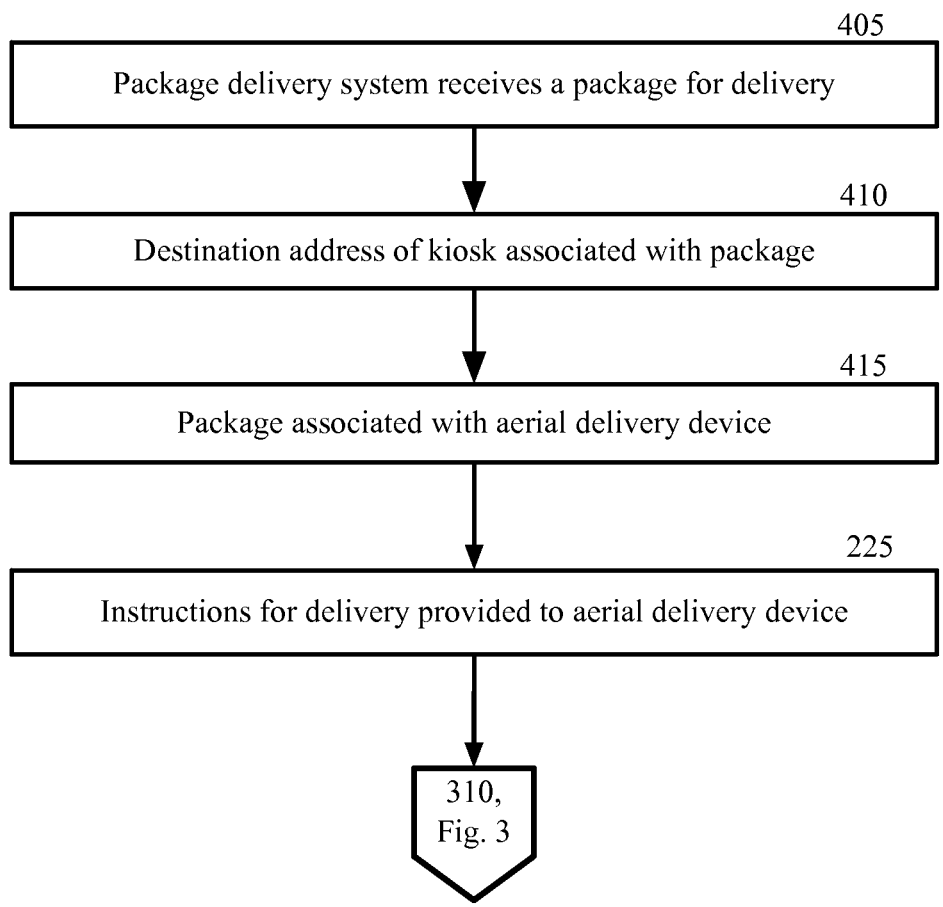
FIG. 4 is a block flow diagram depicting a method for package delivery service to assign a package for delivery, in accordance with certain example embodiments.

FIG. 4 is a block flow diagram depicting a method 305 for the package delivery service to assign a package for delivery, in accordance with certain example embodiments. The method 305 is described with reference to the components illustrated in FIG. 1.

In block 405, a package delivery system 140 receives a package for delivery. The package delivery system 140 may be any system, company, organization, government service, or individual that delivers packages from one entity to another. For example, the package delivery system 140 may be a courier, postal service, package delivery company, a merchant system, a retailer, or any other suitable system that delivers packages. The package for delivery arrives at the package delivery system 140 with appropriate paperwork for delivery to a kiosk 130. The paperwork may be in the form of digital information, a barcode, or other machine-readable code, a sticker, or any suitable paperwork comprising purchase information. The paperwork may contain a user 101 name, a user address, an address of the delivery kiosk 130, a confirmation number, a sender name and address, and/or other identifying information.

The delivery information associated with the package also comprises a kiosk 130 specified for delivery. The kiosk 130 information may comprise an address or other location information for the kiosk 130, a description of the capabilities of the kiosk 130, an availability of compartments in the kiosk 130, compartment sizes, and other suitable information.

In block 410, a destination address of the kiosk 130 is associated with package. For example, the package delivery system 140 obtains the address of the kiosk 130 from the paperwork associated with the package. The delivery address is stored with identification of the package in the package delivery system 140. The delivery address may be a street address, a global positioning system ("GPS") location, or other suitable address data. Additionally, the delivery address may include directions to locate the kiosk 130 on the property at the address. For example, if the kiosk 130 is located near the northwest corner of a retail business, then the delivery address may include that exact location in the delivery address data. In a certain example embodiment, the package delivery system 140 identifies the kiosk 130 nearest to the address of the user 101 and selects the identified kiosk 130 as the delivery kiosk 130.

In block 415, the package delivery system 140 associates the package with an aerial delivery device 120. The package delivery system 140 may identify an aerial delivery device 120 that is associated with a delivery area in which the kiosk address is located. For example, certain aerial delivery devices 120 may be assigned a delivery route that encompasses a particular geographic region. If the kiosk address is located in that geographic region then the package may be associated with that particular aerial delivery device 120. In an alternate embodiment, the package is associated with the aerial delivery device 120 that is next in a queue of aerial delivery devices 120.

In block 420, the instructions for delivery of the package are provided to the aerial delivery device computing system 121. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by a computing system associated with the package delivery system 140. In an example, an operator of the package delivery system 140 may direct a computing system to deliver the instructions, or the operator may enter the instructions directly into a user interface of the aerial delivery device computing system 121. Any suitable manner of transmitting the instructions to the aerial delivery device computing system 121 may be used.

The package delivery system 140 provides to the aerial delivery device computing system 121 an address for the kiosk 130. In another example, the package delivery system provides a GPS location to the aerial delivery device. Additionally, the aerial delivery device computing system 121 is provided with instructions for communicating with the kiosk computing system 131 upon arrival, such as the preferred communication technology, an authorization code, or any other suitable information. Any other suitable instructions that will allow the aerial delivery device to locate the delivery location may be used.

From block 420, the method 210 returns to block 310 of FIG. 3.

Returning to FIG. 3, in block 310, the package is loaded onto the aerial delivery device 120. The package may be loaded in in any suitable manner that allows the aerial delivery device 120 to transport the package to the delivery location. For example, the aerial delivery device 120 may be equipped with a platform for supporting the package during transit. In another example, the aerial delivery device 120 may support the package with a strap, a hook, an attached net, or with any suitable attachment device. The package may be loaded with an automated packaging process. In this example, the aerial delivery device 120 may be positioned under an automated package sorter that drops the package from a sorting chute. The package drops onto a platform of the aerial delivery device 120 that supports packages for transfer to delivery locations. Alternatively, the package may be loaded manually by an operator at the package delivery system 140. The aerial delivery device computing system 121 may receive a digital confirmation of the package's identification from an operator or a computing system of the package delivery system 140.

In block 230 of FIG. 3, the aerial delivery device 120 transports the package to the kiosk address associated with the delivery. For example the aerial delivery device 120 may fly to the address via a predetermined route. The aerial delivery device computing system 121 may use a mapping program to proceed to the address. The aerial delivery device computing system 121 may utilize a global positioning system ("GPS") technology for locating the address of user 101. The aerial delivery device 120 may be transported a portion of the distance to the delivery address by a separate vehicle. For example, a delivery truck may deliver multiple aerial delivery devices 120 to a location that is central to multiple kiosk delivery addresses. The aerial delivery device 120 then leaves the delivery truck and travels the remaining distance with the package.

In an example embodiment, the aerial delivery device 120 arrives at the address of the kiosk 130 when the aerial delivery device 120 is on or above the street directly in front of the kiosk at the address. In another example, the aerial delivery device 120 hovers over the property located at the address.

In block 235, the aerial delivery device computing system 121 alerts the kiosk 130 of arrival. The aerial delivery device computing system 121 communicates wirelessly with the kiosk computing system 131. The communication application 122 of the aerial delivery device computing system 121 may use a communication technology such as near field communication ("NFC"), Wi-Fi, Bluetooth, RFID, cellular, or any suitable communication technology. The preferred communication technology for a particular kiosk computing system 131 may be included in the delivery instructions received from the package delivery service 140. The communication application 132 of the kiosk computing system 131 and the communication application 122 of the aerial delivery device computing system 121 may exchange authentication information or other information to verify the delivery information.

In block 240, the aerial delivery device 120 deposits the package. Block 240 is described in greater detail in the method 240 of FIG. 5.

Figure 5:
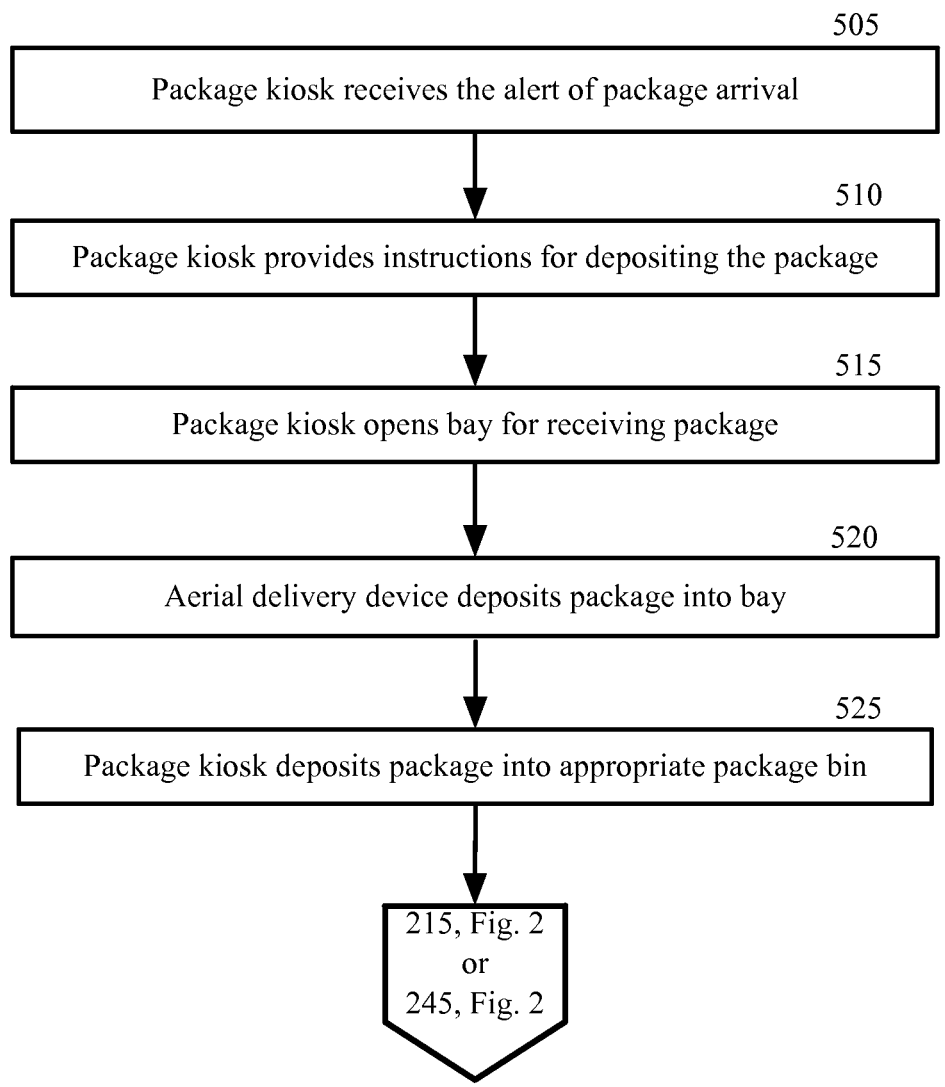
FIG. 5 is a block flow diagram depicting a method for an aerial delivery device to deposit a package to a kiosk, in accordance with certain example embodiments.

FIG. 5 is a block flow diagram depicting a method 240 for an aerial delivery device 120 to deposit a package to a kiosk 130, in accordance with certain example embodiments, as referenced in FIG. 5. The method 240 is described with reference to the components illustrated in FIG. 1.

In block 505, the kiosk 130 receives the alert of the package arrival from the aerial delivery device computing system 121. The aerial delivery device computing system 121 transmits, over the communication technology, a message that an expected package has arrived and is available for deposit into the kiosk 130. The kiosk computing system 131 transmits an acknowledgment that the package is at the appropriate kiosk 130. The kiosk computing system 131 may receive the package information from aerial delivery device computing system 121 and confirm the delivery information for the package. For example, the kiosk computing system 131 may communicate with the package delivery service 140 or the user computing device 110 to verify that the package is configured to be delivered to the kiosk 130.

In block 510, the kiosk computing system 131 provides instructions for depositing the package. For example, the kiosk computing system 131 may provide to the aerial delivery device computing system 121 an approach route to the kiosk from the street that will provide the safest flight path. In another example, the kiosk computing system 131 provides instructions for locating the package receiving bay of the kiosk 130. In an alternative embodiment, the kiosk computing system 131 may provide a continuous wireless signal to the aerial delivery device computing system 121 that will guide the aerial delivery device 120 to the kiosk 130 location. In another example, the kiosk computing system 131 provides information regarding procedures required to deposit a package into the bay.

In block 515, the kiosk 130 opens the bay for receiving the package. The bay may be a landing pad on the kiosk 130, a chute for receiving the package, a retractable door, or any suitable receptacle for receiving the package. The bay may be opened or otherwise prepared by activating a mechanical door, an automated landing platform, or any suitable mechanism.

In block 520, the aerial delivery device 120 deposits the package into the bay.

For example, the aerial delivery device 120 may hover over the bay and lower the package via a retractable line or cable into the bay of the kiosk 130. The aerial delivery device 120 may release the line or cable by transmitting a communication to a clasp, hook, or other device to release. The aerial delivery device 120 may proceed to move away from the bay with the package no longer attached, or the line or cable may retract into the aerial delivery device 120 with the package no longer attached. In another example, the aerial delivery device 120 hovers over the delivery platform and releases the package allowing the package to drop to a delivery platform or into the bay. The aerial delivery device 120 may deposit the package in any suitable manner.

The bay may employ a platform for receiving the package instead of an open chute or bay. After receiving the package on a platform, the kiosk 130 transports the package inside the kiosk 130. For example, the kiosk computing system 131 may activate a conveyor belt or other mechanical means to transport the package.

In block for 425, the kiosk 130 deposits the package into the appropriate package bin. For example, the kiosk computing system 131 employees an automated mechanical means for transporting the package to the appropriate bin. The kiosk computing system 131 may utilize a series of conveyor belts, electro-hydraulic grabbers, robotic handling equipment, automated storage and retrieval systems, or other means of transporting the package into the appropriate bin.

From block 525, the method 230 returns to block 215 of FIG. 2.

Returning to FIG. 2, in block 215, the user 101 requests a delivery destination change. The user 101 requests that the package be delivered to a different kiosk 130 for retrieval by the user 101. The user 101 may desire a change of delivery kiosk 130 for any suitable reason. For example, the user 101 may not be able to reach the location of the original kiosk 130 because of a change in the work schedule of the user 101. In another example, the user 101 may realize that an error was made in the original kiosk 130 selection.

In an example, the user 101 accesses the delivery application 115 on the user computing device 110 and selects an option to change the delivery kiosk 130. The user 101 may actuate a user interface object and select a new kiosk 130 location from a list of kiosks 130. In another example, the user 101 may access a webpage of the package delivery service 140 and select the option to change the delivery kiosk 130. In another example, the user 101 requests the change in the delivery kiosk 130 to a merchant system or other product shipper and the change is submitted to the package delivery system 140 by the merchant system. In another example, the user 101 submits a verbal request for the change in the delivery kiosk 130. Any suitable manner of requesting the change in the delivery kiosk 130 may be used.

In block 217, the instructions for retrieval of the package are provided to the aerial delivery device computing system 121. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by the package delivery system 140. In an alternate embodiment, the instructions for retrieval of the package are provided to the aerial delivery device computing system 121 by the by the communication application 132 of the kiosk computing system 131, by a merchant system, or by any suitable party. Any suitable manner of transmitting the instructions to the aerial delivery device computing system 121 may be used.

The package delivery system 140, or other party, provides the aerial delivery device computing system 121 with an address for the first kiosk 130. In another example, the package delivery system provides a GPS location to the aerial delivery device computing system 121. Additionally, the aerial delivery device computing system 121 is provided with instructions for communicating with the kiosk computing system 131 upon arrival, such as the preferred communication technology, an authorization code, or any other suitable information. Any other suitable instructions that will allow the aerial delivery device computing system 121 to locate the delivery location may be used.

In block 220, the aerial delivery device 120 retrieves the package from the kiosk 130. Block 220 is described in greater detail in the method 220 of FIG. 6.

Figure 6:
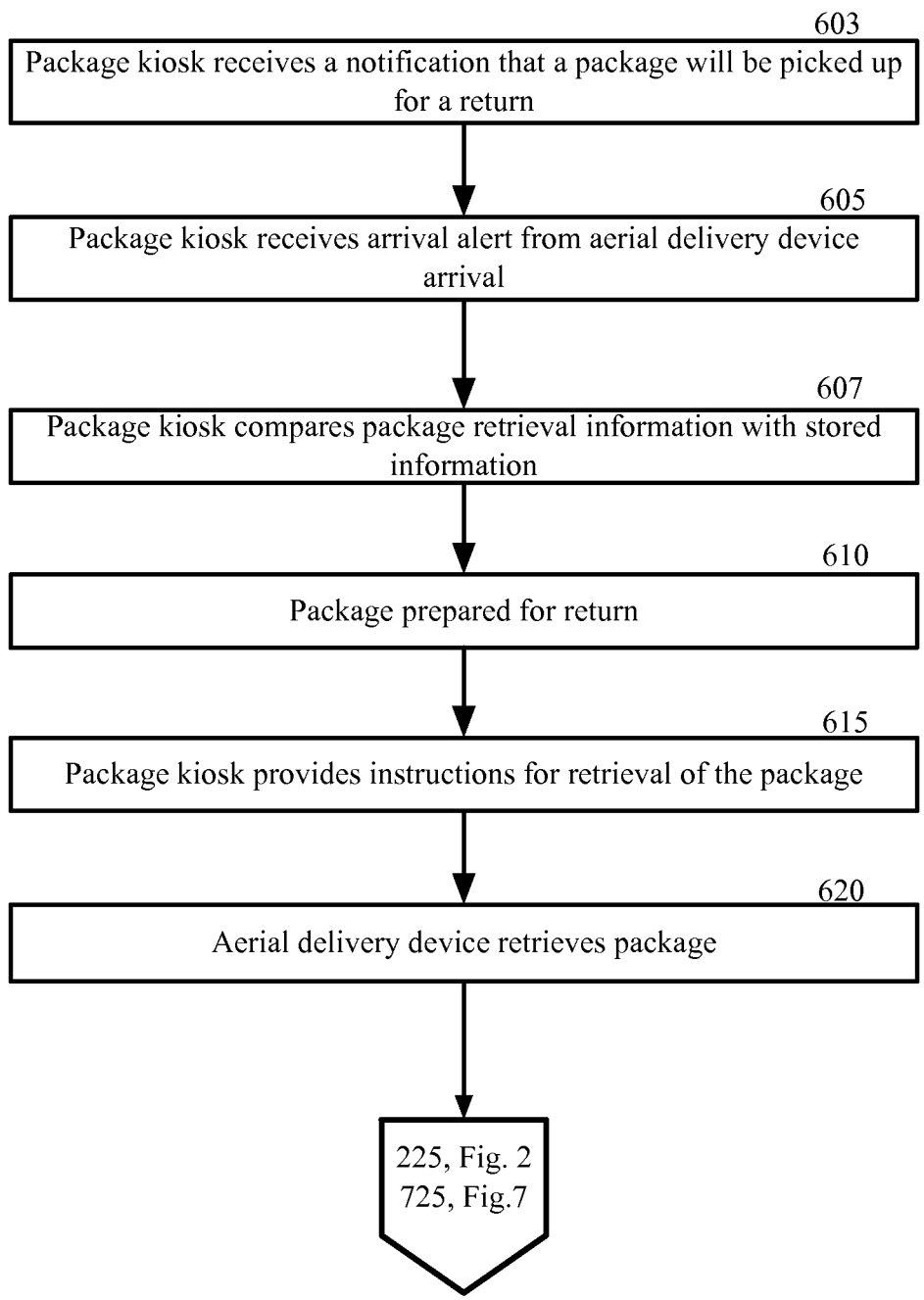
FIG. 6 is a block flow diagram depicting a method for an aerial delivery device to retrieve a package from a kiosk, in accordance with certain example embodiments.

FIG. 6 is a block flow diagram depicting a method 220 for an aerial delivery device 120 to retrieve a package from a kiosk 130, in accordance with certain example embodiments. The method 220 is described with reference to the components illustrated in FIG. 1.

In block 603, the kiosk computing system 131 receives a notification that a package will be picked up for a return. In an example, the package delivery system 140 provides a communication to the communication application 132 of the kiosk computing system 131 that a package will be retrieved by an aerial delivery device 120 at a specific date and time. The communication may be provided via any suitable communication technology such as an Internet connection over the network 105, via a wireless communication, via cellular, or any suitable technology. The communication may provide a package identification, an aerial delivery device 120 identification, or any suitable information. The communication may provide instructions to the kiosk 130 for preparing the package for return. For example, the communication may provide the manner of retrieval by the drone and suitable instructions for placement of the package for retrieval.

The kiosk computing system 131 stores the provided information in anticipation of the arrival of the delivery device 120.

In block 605, the kiosk computing system 131 receives the alert of the arrival of the aerial delivery device 120. The aerial delivery device computing system 121 transmits, over the communication technology, a message that an expected aerial delivery device 120 has arrived and is available to retrieve a scheduled package. The kiosk computing system 131 transmits an acknowledgment that the aerial delivery device 120 is at the appropriate kiosk 130. The kiosk computing system 131 may receive the retrieval information from aerial delivery device computing system 121 and confirm the retrieval information for the package. For example, the kiosk computing system 131 may communicate with the package delivery service 140 or the user computing device 110 to verify that the package is configured to be retrieved from the kiosk 130.

In block 607, the kiosk computing system 131 compares package retrieval information with stored information. For example, the kiosk computing system 131 receives the retrieval information from aerial delivery device computing system 121 and confirms the retrieval information for the package. The kiosk computing system 131 assesses the stored retrieval information received from the package delivery service 140 and compares the information the information received from the aerial delivery device computing system 121.

In an alternate example, the kiosk computing system 131 may communicate with the package delivery service 140 or the user computing device 110 to verify that the package is configured to be retrieved from the kiosk 130. In an alternate example, the kiosk computing system 131 has not previously received the retrieval information and only uses the retrieval information provided by the aerial delivery device computing system 121.

In block 610, the package is prepared for return. The package is retrieved from the appropriate package bin. For example, the kiosk 130 employs an automated mechanical means for transporting the package from the appropriate bin. The kiosk 130 may utilize a series of conveyor belts, electro-hydraulic grabbers, robotic handling equipment, automated storage and retrieval systems, or other means of transporting the package from the appropriate bin and to a position for retrieval by the aerial delivery device 120. In an example, the package is positioned on a platform associated with the bay. In another example, the package is positioned on a separate retrieval platform, or in any suitable position. In certain embodiments, the kiosk computing system 131 provides the package with new, written delivery information. For example, the kiosk 130 may apply a new sticker to the package with the destination address of the new delivery kiosk 130. In an example, a printer installed within the kiosk 130 is provided instructions by the kiosk computing system 131 to print a new destination address onto the surface of a package. The package may be positioned before the printer by a mechanically actuated system, such as a conveyor belt.

The printer sprays, prints, or in any suitable manner applies the destination address to the surface of the positioned package.

In block 615, the kiosk computing system 131 provides instructions for retrieving the package. For example, the kiosk computing system 131 may provide an approach route to the kiosk from the street that will provide the safest flight path. In another example, the kiosk computing system 131 provides instructions for locating the package receiving bay of the kiosk 130. In an alternative embodiment, the kiosk computing system 131 may provide a continuous wireless signal to the aerial delivery device computing system 121 that will guide the aerial delivery device 120 the kiosk 130 location. In another example, the kiosk computing system 131 provides information regarding procedures required to retrieve a package from the bay.

In block 620, aerial delivery device 120 retrieves the package from the kiosk 130. In an example, the kiosk 130 opens the bay to allow the aerial delivery device 120 to access the package. The bay may be a landing pad on the kiosk 130, a chute for receiving the package, a retractable door, or any suitable receptacle for retrieving the package. The bay may be opened or otherwise prepared by activating a mechanical door, an automated landing platform, or any suitable mechanism. In the example, the aerial delivery device 120 lands on the platform associated with the bay and secures the package. The package may be loaded on the aerial delivery device 120 in in any suitable manner that allows the aerial delivery device 120 to transport the package to the new delivery location. For example, the aerial delivery device 120 may be equipped with a platform for supporting the package during transit. In another example, the aerial delivery device 120 may support the package with a strap, a hook, an attached net, or with any suitable attachment device. The package maybe loaded with an automated packaging process. The aerial delivery device computing system 121 may receive a digital confirmation of the package's identification from the kiosk computing system 131.

From block 620, the method 220 returns to block 225 of FIG. 2.

Returning to FIG. 2, in block 225, the instructions for delivery of the package are provided to the aerial delivery device computing system 121. In an example embodiment, the instructions are delivered to the communication application 122 of the aerial delivery device computing system 121 via near field communication, Bluetooth, Wi-Fi, or any available communication by the package delivery system 140. The instructions may be provided at any time during the retrieval process. For example, the instructions for delivering the package may be provided at the time that the retrieval instructions were provided. In an alternate embodiment, the instructions for delivery of the package are provided to the aerial delivery device computing system 121 by the by the communication application 132 of the kiosk 130, by a merchant system, or by any suitable party. Any suitable manner of transmitting the instructions to the aerial delivery device computing system 121 may be used.

The package delivery system 140, or other party, provides the aerial delivery device computing system 121 with an address for the new kiosk 130. In another example, the package delivery system provides a GPS location to the aerial delivery device computing system 121. Additionally, the aerial delivery device computing system 121 is provided with instructions for communicating with the kiosk computing system 131 upon arrival, such as the preferred communication technology, an authorization code, or any other suitable information. Any other suitable instructions that will allow the aerial delivery device computing system 121 to locate the delivery location may be used.

In certain embodiments, the aerial delivery device 120 delivers the package back to the package delivery service 140. The package is assigned to a different aerial delivery device for delivery to the second kiosk 130.

In block 230, the aerial delivery device 120 transports the package to the new kiosk 130 address associated with the delivery. For example the aerial delivery device 120 may fly to the address via a predetermined route. The aerial delivery device computing system 121 may use a mapping program to proceed to the address. The aerial delivery device computing system 121 may utilize a global positioning system ("GPS") technology for locating the address of user 101. The aerial delivery device 120 may be transported a portion of the distance to the delivery address by a separate vehicle. For example, a delivery truck may deliver multiple aerial delivery devices 120 to within a location that is central to multiple delivery addresses. The aerial delivery device 120 then leaves the delivery truck and travels the remaining distance with the package.

In an example embodiment, the aerial delivery device 120 arrives at the address of the kiosk when the aerial delivery device 120 is on or above the street directly in front of the kiosk at the address. In another example, the aerial delivery device 120 hovers over the property located at the address.

In block 235, the aerial delivery device 120 alerts the kiosk computing system 131 of arrival. The aerial delivery device computing system 121 communicates wirelessly with the kiosk computing system 131. The communication application 122 of the aerial delivery device computing system 121 may use a communication technology such as near field communication ("NFC"), Wi-Fi, Bluetooth, RFID, cellular, or any suitable communication technology. The preferred communication technology may be included in the delivery instructions received from the package delivery service 140. The communication application 132 of the kiosk computing system 131 and the communication application 122 of the aerial delivery device computing system 121 may exchange authentication information or other information to verify the delivery information.

In block 240, the aerial delivery device 120 deposits the package. Block 240 is described in greater detail in the method 240 of FIG. 5 as described herein.

In block 245, the user 101 enters authentication information into the user interface the kiosk computing system 131. In an example, the kiosk computing system 131, the aerial delivery device computing system 121, the package delivery service 140, a merchant system, or other suitable party alerts the user computing device 110 that the package is available for retrieval at the kiosk 130. The user 101 approaches the kiosk 130 and accesses the user interface. The user interface of the kiosk computing system 131 may be a touchscreen interface, an alphanumeric keypad, a voice activated interface, or other suitable user interface. The user 101 enters an authentication code to access the kiosk bin. The authentication code maybe a code is associated with the user 101 such as a password or personal identification number. The code may be configured for use by the user 101 for all package retrievals. Alternatively, the code may be a single use code that was established at the time of the delivery arrangement.

In block 250, if the user code is authenticated then the kiosk computing system 131 grants access to the user 101 to be appropriate bin. In an example, the kiosk computing system 131 transmits a signal to the locking device of the bin causing the bin to open. In another example, the user interface of the kiosk computing system 131 provides information, such as a combination code, allowing the user 101 to open the bin. Any other suitable manner of allowing the user 101 access to the bin may be used.

The user 101 retrieves the package from the bin. The kiosk computing system 131 logs the retrieval of the package by the user 101. The kiosk computing system 131 notifies the package delivery system 140, the user computing device 110, a merchant system, or other suitable party that the package has been retrieved.

Figure 7:
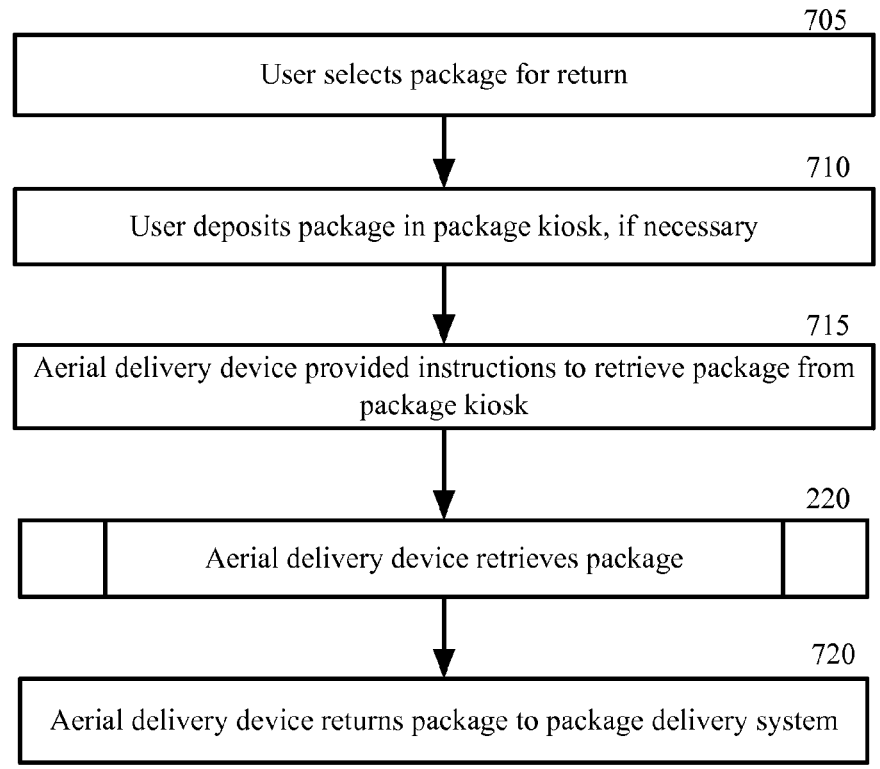
FIG. 7 is a block flow diagram depicting a method for an aerial delivery device to return a package from a kiosk to the package delivery system, in accordance with certain example embodiments.

FIG. 7 is a block flow diagram depicting a method 700 for an aerial delivery device 120 to return a package from a kiosk 130 to the package delivery system 140, in accordance with certain example embodiments. The method 700 is described with reference to the components illustrated in FIG. 1.

In certain situations, the user 101 or another party desires that the package be returned to the package delivery system 140 instead of to another kiosk 130. For example, if a user 101 is returning a package to a merchant system or a retailer, then the package may be returned via the package delivery system 140. In another example, the package delivery system 140 delivered a package to an incorrect recipient. In the example, the package received in incorrect label and the package was delivered to a user 101 that was not the intended recipient. The user 101 may be instructed to return the package to the package delivery system 140. The package may be returned to the package delivery system 140 for any other suitable reason.

In block 705, the user 101 selects a package for return. The user 101 requests that the package be returned from a kiosk 130. The user 101 may desire a return from the kiosk 130 for any suitable reason. For example, the user 101 may have determined that the package did not contain the product that was expected. In another example, the user 101 may realize that an error was made and that the product was intended for a different user.

In an example, the user 101 accesses the delivery application 115 on the user computing device 110 and selects an option to return the package from a kiosk 130. The user 101 may actuate a user interface object and select an option to return the package from a particular kiosk 130 from a list of kiosks 130. In another example, the user 101 may access a webpage of the package delivery service 140 and select a similar option. In another example, the user 101 requests a return on a merchant system or other product shipper and the return request is submitted to the package delivery system 140 by the merchant system. In another example, the user 101 submits a verbal request for the return. Any suitable manner of requesting the return of the package to the kiosk 130 may be used.

In block 710, the user 101 deposits the package in the package kiosk 130 if the package had previously been retrieved from the kiosk 130 or if the user 101 otherwise has possession of the product. In a certain example embodiment, the user 101 purchased a product at a merchant location and later requested to return the product. In this example, the user 101 did not receive the product at the kiosk 130, but the user 101 desires to utilize the kiosk 130 for the return of the package. The user 101 may be instructed by the payment delivery service 140 or another party to return the package to the kiosk 130. The user 101, the payment delivery service 140, or another party may select the appropriate kiosk 130.

Upon approaching the kiosk 130, the user 101 enters authentication information into the user interface the kiosk computing system 131. In an example, the kiosk computing system 131, the aerial delivery device computing system 121, the package delivery service 140, a merchant system, or other suitable party alerts the user computing device 110 that the package is being returned at the kiosk 130. The user 101 approaches the kiosk 130 and accesses the user interface. The user interface of the kiosk computing system 131 may be a touchscreen interface, an alphanumeric keypad, a voice activated interface, or other suitable user interface. The user 101 enters an authentication code to access the kiosk bin. The authentication code maybe a code is associated with the user 101 such as a password or personal identification number. The code may be configured for use by the user 101 for all package retrievals. Alternatively, the code may be a single use code that was established at the time of the delivery arrangement.

The user code is authenticated then the kiosk computing system 131 grants access to the user 101 to be appropriate bin. In an example, the kiosk computing system 131 transmits a signal to the locking device of the bin causing the bin to open. In another example, the user interface of the kiosk computing system 131 provides information, such as a combination code, allowing the user 101 to open the bin. Any other suitable manner of allowing the user 101 access to the bin may be used. The user 101 deposits the package in the accessed bin of the kiosk 130.

In another embodiment, the user 101 has does not have possession of the package. In the example, the package has never been retrieved from the kiosk 130 and is residing in the appropriate bin. In this example, the user 101 does not need to return the package to the kiosk 130.

In block 715, the aerial delivery device 120 receives instructions to retrieve the package from the package kiosk 130. The instructions for retrieval of the package are provided to the aerial delivery device computing system 121 by the package delivery service 140. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by the package delivery system 140. In an alternate embodiment, the instructions for delivery of the package are provided to the aerial delivery device computing system 121 by the by the communication application 132 of the kiosk computing system 131, by a merchant system, or by any suitable party. Any suitable manner of transmitting the instructions to the aerial delivery device computing system 121 may be used.

The package delivery system 140, or other party, provides the aerial delivery device computing system 121 with an address for the kiosk 130. In another example, the package delivery system provides a GPS location to the aerial delivery device computing system 121. Additionally, the aerial delivery device computing system 121 is provided with instructions for communicating with the kiosk computing system 131 upon arrival, such as the preferred communication technology, an authorization code, or any other suitable information. Any other suitable instructions that will allow the aerial delivery device computing system 121 to locate the delivery location may be used.

In block 220, the aerial delivery device 120 retrieves the package. The details of block 220 are described in greater detail in the method 220 of FIG. 6 as described herein.

In block 720, the aerial delivery device 120 returns the package to the package delivery system 140. The aerial delivery device 120 may deliver the package to a warehouse or other facility associated with the package delivery system 140. In another embodiment, the aerial delivery device 120 delivers the package to a vehicle associated with the package delivery system 140, such as a delivery truck. In another embodiment, the aerial delivery device 120 delivers the package to a merchant system or other product shipper. Any suitable method for returning the package may be utilized.

Other Example Embodiments

Figure 8:
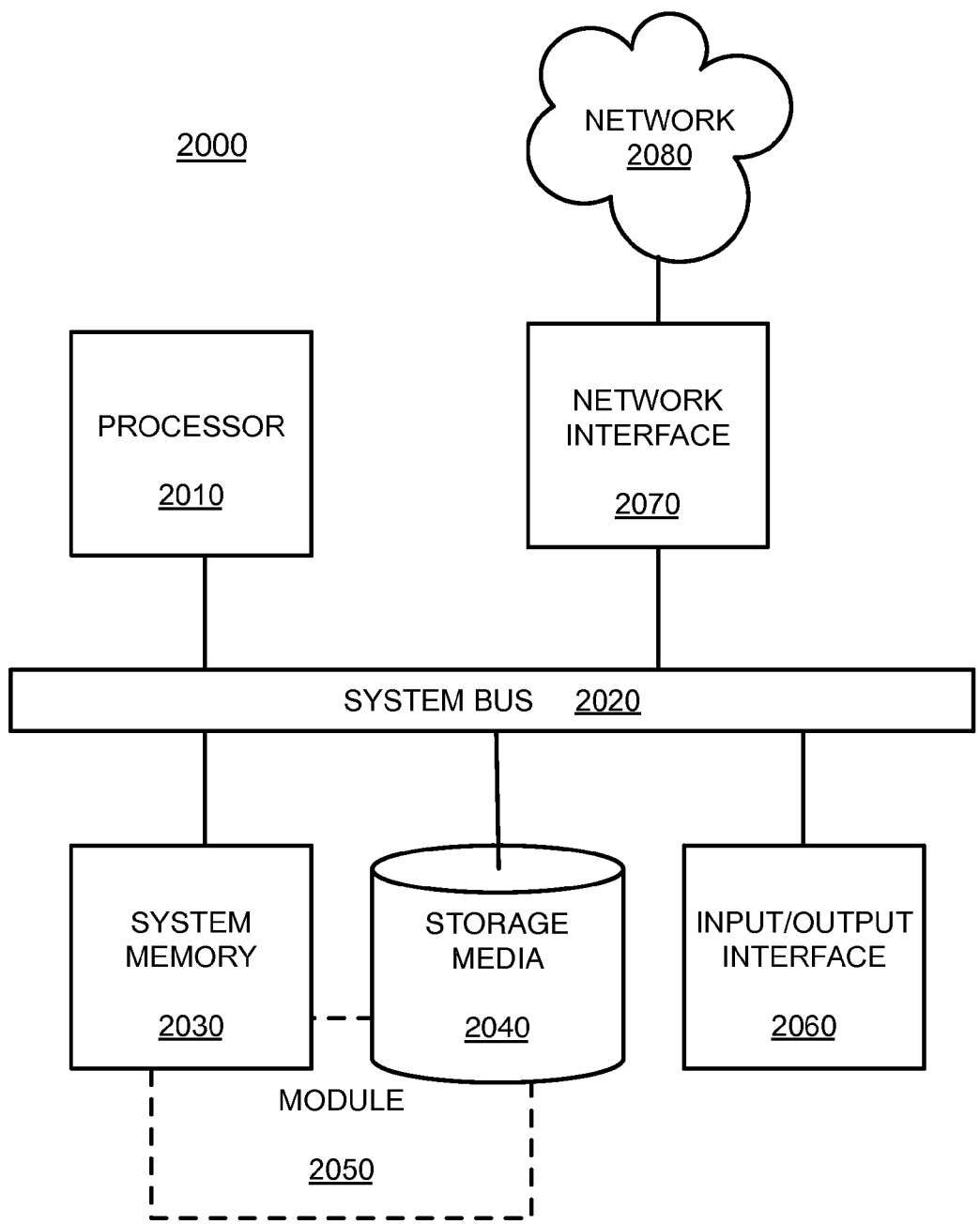
FIG. 8 is a block diagram depicting a computer machine and module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, a television with one or more processors embedded therein and/or coupled thereto, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to deliver packages to unmanned kiosks, retrieve packages, and deliver packages to alternate unmanned kiosks, comprising:
   transmitting, by one or more computing devices, to an unmanned delivery device instructions to deliver a package to a first unmanned kiosk and information associated with the first unmanned kiosk location, the information comprising a location of the first unmanned kiosk and information associated with the package;

based on the information associated with the first unmanned kiosk location, delivering, by the unmanned delivery device, the package to the first unmanned kiosk;

transmitting, by the unmanned delivery device to the first unmanned kiosk, the information associated with the package;

at a time before a user associated with the package retrieves the package from the first kiosk, receiving, by the one or more computing devices, a request from a user computing device to retrieve the package from the first unmanned kiosk and to deliver the package to an alternate unmanned kiosk;

transmitting, by the one or more computing devices, to the unmanned delivery device instructions to retrieve the package from the first unmanned kiosk and instructions to deliver the package to the alternate unmanned kiosk and the information associated with the alternate unmanned kiosk location, the information comprising the first unmanned kiosk location and the information associated with the package to allow the unmanned delivery device to retrieve the package from the first unmanned kiosk and to deliver the package to the alternate unmanned kiosk;

receiving, by the unmanned delivery device, instructions from the first unmanned kiosk, the instructions comprising one or more of an approach route and a procedure to retrieve the package;

based on the instructions received from the first unmanned kiosk, retrieving, by the unmanned delivery device, the package from the first unmanned kiosk;

based on the information associated with the alternate unmanned kiosk location, delivering, by the unmanned delivery device, the package to the alternate unmanned kiosk; and transmitting, by the unmanned delivery device to the alternate unmanned kiosk, the information associated with the package.

2. The method of claim 1, further comprising:

receiving, by the alternate unmanned kiosk, a communication from the unmanned delivery device, the communication comprising an identification of the unmanned delivery device;

preparing, by the alternate unmanned kiosk, a bay for receiving the package from the unmanned delivery device;

after receiving the package from the unmanned delivery device, transporting, by the alternate unmanned kiosk, the package to a package bin;

receiving, by the alternate unmanned kiosk, an input of a user authentication by the user;

verifying, by the alternate unmanned kiosk, the user authentication based on the information associated with the package; and in response to verifying the user authentication, providing, by the alternate unmanned kiosk, access to the package bin to the user.

3. The method of claim 2, further comprising transmitting, by the alternate unmanned kiosk, instructions to the unmanned delivery device to deposit the package in the bay.

4. The method of claim 1, wherein the information associated with the first unmanned kiosk and the alternate unmanned kiosk locations comprises a GPS location of the first unmanned kiosk and the alternate unmanned kiosk, respectively.

5. The method of claim 1, wherein the information associated with the first unmanned kiosk and the alternate unmanned kiosk comprises an address of the first kiosk and the alternate unmanned kiosk locations, respectively.

6. The method of claim 1, further comprising:

receiving, by the first unmanned kiosk, an input of an authentication by a user to return a package;

verifying, by the first unmanned kiosk, the user authentication based on the information associated with the package;

providing, by the first unmanned kiosk, access to a bin to receive the package from the user, receiving, by the first unmanned kiosk, a communication from the unmanned delivery device, the communication comprising an identification of the unmanned delivery device and information associated with the package; and providing, by the first unmanned kiosk, the package to the bay for retrieval by the unmanned delivery device.

7. The method of claim 1, further comprising:

receiving, by the first unmanned kiosk and from the one or more computing devices, instructions to provide the package to a delivery device for return, the instructions comprising an identification of the unmanned delivery device and information associated with the package;

receiving, by the first unmanned kiosk, a communication from the unmanned delivery device, the communication comprising an identification of the unmanned delivery device and information associated with the package; and providing, by the first unmanned kiosk, the package to the bay for retrieval by the unmanned delivery device.

8. A system to deliver packages to unmanned kiosks, retrieve packages, and deliver packages to alternate unmanned kiosks, comprising:

a storage device for an unmanned delivery device; and a processor communicatively coupled to the storage device, wherein the processor executes application code instructions that are stored in the storage device to cause the system to:

at a time before a user associated with a package retrieves the package from a first unmanned kiosk, receive, from a package delivery system computing device, information associated with a location of the first unmanned kiosk for retrieval of the package, the information comprising an identification of the package;

establish a communication with the first unmanned kiosk;

receive instructions from the first unmanned kiosk for accessing the package in a bay of the kiosk;

secure the package for transportation;

receive, from a package delivery system computing device, information associated with a location of a second unmanned kiosk for delivery of the package, the information comprising an identification of the package;

transport the package to the location of the second unmanned kiosk;

establish a communication with the second unmanned kiosk;

verify that the second unmanned kiosk is associated with the identification of the package;

receive instructions from the second unmanned kiosk for depositing the package in a bay of the second unmanned kiosk; and deposit the package in the bay of the second unmanned kiosk.

9. The system of claim 8, further comprising:
a storage device for a first kiosk; and
a processor communicatively coupled to the storage device for the first unmanned kiosk, wherein the processor executes application code instructions that are stored in the storage device to cause the system to:
receive a communication from the package delivery system computing device, the communication comprising an identification of the unmanned delivery device and information associated with the package that is to be retrieved;
upon arrival at the first unmanned kiosk by the delivery device, receive a communication from the unmanned delivery device, the communication comprising an identification of the unmanned delivery device and information associated with the package;
prepare the bay to be accessed by the unmanned delivery device;
transport the package from a package bin to the bay for retrieval by the unmanned delivery device; and
provide a verification to the package delivery system computing device that the package has been retrieved.

10. The system of claim 9, wherein the transporting of the package from the package bin to the bay is performed by an automated mechanical system.

11. The system of claim 9, wherein the transporting of the package from a package bin is performed by an automated mechanical system.

12. The system of claim 8, wherein the information associated with the kiosk location comprises a GPS location of the kiosk.

13. The system of claim 8, wherein the information associated with the location of the second unmanned kiosk comprises an address of the second unmanned kiosk.

14. The system of claim 8, further comprising:
a storage device for a second unmanned kiosk; and
a processor communicatively coupled to the storage device for the second unmanned kiosk, wherein the processor executes application code instructions that are stored in the storage device to cause the system to:
receive a communication from the unmanned delivery device, the communication comprising an identification of the unmanned delivery device and information associated with the package;
prepare a bay for receiving the package from the unmanned delivery device;
receive the package from the unmanned delivery device;
transport the package to a package bin;
receive an input of a user authentication from the user;
verify the user authentication based on the information associated with the package and the transmitted user authentication; and
provide access to the package bin to the user.

15. A computer program product, comprising:
a non-transitory computer-readable medium having computer-executable program instructions embodied thereon that when executed by a computer cause the computer to automatically return packages, the computer-executable instructions comprising:
computer-executable program instructions to transmit to an unmanned delivery device information associated with a location of a first unmanned kiosk, the information comprising the first unmanned kiosk location, and information associated with a package to be delivered;
computer-executable program instructions to receive a communication from the unmanned delivery device that the package is delivered to the first unmanned kiosk location and is stored in the first unmanned kiosk;
after receiving the communication that the package is delivered to the first unmanned kiosk location, computer-executable program instructions to receive a request from a user computing device to retrieve the package from the first unmanned kiosk and deliver the package to a second unmanned kiosk;
computer-executable program instructions to transmit instructions to the first unmanned kiosk to prepare the package for retrieval by the unmanned delivery device;
computer-executable program instructions to transmit to the unmanned delivery device instructions to retrieve the package from the first unmanned kiosk;
computer-executable program instructions to transmit to the unmanned delivery device instructions to deliver the package to the second unmanned kiosk and the information associated with a location of the second unmanned kiosk, the information comprising the second unmanned kiosk location, and information associated with the package;
computer-executable program instructions to receive a communication from the unmanned delivery device that the package is delivered to the second unmanned kiosk location and is stored in the second unmanned kiosk.

16. The computer program product of claim 15, further comprising computer-executable program instructions to transmit instructions to the first unmanned kiosk to prepare the package for retrieval by the unmanned delivery device.

17. The computer program product of claim 15, further comprising computer-executable program instructions to transmit instructions to the second unmanned kiosk to receive the package, the instructions comprising information associated with the package.

18. The computer program product of claim 15, wherein the information associated with the first unmanned kiosk and the second unmanned kiosk locations comprises a GPS location of the first unmanned kiosk and the second unmanned kiosk.

19. The computer program product of claim 15, wherein the information associated with the first unmanned kiosk and the second unmanned kiosk comprises an address of the first unmanned kiosk and the second unmanned kiosk locations.

* * * * *